(12) United States Patent
Jessen et al.

(10) Patent No.: US 10,173,174 B2
(45) Date of Patent: *Jan. 8, 2019

(54) MEMBRANE STACKS

(71) Applicant: Fujifilm Manufacturing Europe B.V., Tilburg (NL)

(72) Inventors: Peter Jessen, Tilburg (NL); Vinodnarain Bhikhi, Tilburg (NL); Willem Van Baak, Tilburg (NL); Johannes Van Engelen, Tilburg (NL); Bastiaan Van Berchum, Tilburg (NL)

(73) Assignee: Fujifilm Manufacturing Europe B.V. (NL)

( * ) Notice: Subject to any disclaimer, the term of this patent is extended or adjusted under 35 U.S.C. 154(b) by 16 days.
This patent is subject to a terminal disclaimer.

(21) Appl. No.: 15/120,145

(22) PCT Filed: Feb. 25, 2015

(86) PCT No.: PCT/GB2015/050530
§ 371 (c)(1),
(2) Date: Aug. 19, 2016

(87) PCT Pub. No.: WO2015/128630
PCT Pub. Date: Sep. 3, 2015

(65) Prior Publication Data
US 2017/0056828 A1  Mar. 2, 2017

(30) Foreign Application Priority Data

Feb. 28, 2014 (GB) .................................. 1403551.3

(51) Int. Cl.
B29C 65/00 (2006.01)
B01D 65/00 (2006.01)
(Continued)

(52) U.S. Cl.
CPC .......... B01D 65/003 (2013.01); B01D 61/50 (2013.01); B01D 63/081 (2013.01);
(Continued)

(58) Field of Classification Search
CPC ..... B29C 65/48; B29C 65/4085; B29C 66/70; B29C 65/4855; Y10T 156/1089; Y10T 156/1744
(Continued)

(56) References Cited

U.S. PATENT DOCUMENTS 4,769,150 A * 9/1988 Ramstack ........... A61M 1/3496
210/195.2
4,804,451 A   2/1989 Palmer
(Continued)

FOREIGN PATENT DOCUMENTS

| CN | 103146341 A | 6/2013 |
|---|---|---|
| DE | 4003812 A1 | 8/1990 |
| WO | 2005009596 A1 | 2/2005 |

OTHER PUBLICATIONS

Duralco leaflet.

*Primary Examiner* — Mark A Osele
*Assistant Examiner* — Nickolas R Harm
(74) *Attorney, Agent, or Firm* — Banner & Witcoff, Ltd.

(57) ABSTRACT

A process for preparing a membrane stack comprising the steps of: (i) interposing a curable adhesive between alternate anion exchange membranes and cation exchange; and (ii) curing the adhesive; CHARACTERIZED IN THAT said adhesive, when cured, has a Shore A hardness of less than 70 and an elongation at break of at least 50%.

16 Claims, 2 Drawing Sheets

(51) Int. Cl.
    *B01D 61/50*             (2006.01)
    *B01D 63/08*             (2006.01)
    *B29C 65/48*             (2006.01)

(52) U.S. Cl.
    CPC ........ *B01D 63/082* (2013.01); *B01D 2315/10* (2013.01); *B01D 2325/08* (2013.01); *B01D 2325/14* (2013.01); *B01D 2325/16* (2013.01); *B29C 65/48* (2013.01); *B29C 65/4805* (2013.01); *B29C 65/4855* (2013.01); *B29C 66/70* (2013.01); *Y10T 156/1089* (2015.01); *Y10T 156/1744* (2015.01)

(58) Field of Classification Search
    USPC .................. 156/182, 306.9, 307.1, 313, 325
    See application file for complete search history.

(56) References Cited

U.S. PATENT DOCUMENTS

| | | | |
|---|---|---|---|
| 6,338,784 B1* | 1/2002 | Terada | B01D 61/48 204/632 |
| 6,596,112 B1 | 7/2003 | Ditter et al. | |
| 7,210,276 B1* | 5/2007 | Kraft | E04F 15/022 156/74 |
| 2001/0049047 A1 | 12/2001 | Mizuno | |
| 2004/0127614 A1* | 7/2004 | Jiang | C08F 10/00 524/270 |
| 2004/0161655 A1 | 8/2004 | Murphy et al. | |
| 2006/0016685 A1 | 1/2006 | Hawkins et al. | |
| 2008/0047240 A1* | 2/2008 | Trautmann | B01D 46/10 55/385.3 |
| 2011/0086291 A1* | 4/2011 | Valk | B01D 61/50 429/498 |
| 2011/0097645 A1* | 4/2011 | Van Baak | B01D 61/44 429/492 |
| 2012/0024704 A1 | 2/2012 | Sparrow et al. | |
| 2012/0117789 A1 | 5/2012 | Liang et al. | |
| 2012/0118743 A1 | 5/2012 | Liang et al. | |
| 2012/0248028 A1 | 10/2012 | Antheunis et al. | |
| 2012/0248029 A1 | 10/2012 | Antheunis et al. | |
| 2012/0248030 A1 | 10/2012 | Antheunis et al. | |
| 2012/0298578 A1 | 11/2012 | Herrington et al. | |
| 2013/0017416 A1 | 1/2013 | Goeting et al. | |
| 2013/0267637 A1* | 10/2013 | Varkey | C08G 18/12 524/270 |
| 2014/0138802 A1 | 5/2014 | Starostine et al. | |
| 2015/0290594 A1* | 10/2015 | Van Berchum | B01D 67/0006 210/500.35 |
| 2016/0040050 A1* | 2/2016 | Munoz | B29C 73/02 156/327 |

\* cited by examiner

MEMBRANE STACKS

RELATED APPLICATIONS

This application is a National Stage Application under 35 U.S.C. 371 of co-pending PCT application PCT/GB2015/050530 designating the United States and filed Feb. 25, 2015; which claims the benefit of GB application number 1403551.3 and filed Feb. 28, 2014 each of which are hereby incorporated by reference in their entireties.

The present invention relates to membrane stacks, to ion exchange units comprising them and to a process for their preparation.

Ion exchange units ("IEUs") such as reverse electrodialysis units and electrodialysis units are known.

IEUs typically comprise an anode, a cathode and a membrane stack located between the anode and cathode. The membrane stacks comprise alternating dilution compartments and concentration compartments, each compartment comprising a cation-permeable membrane wall and an anion-permeable membrane wall. In reverse electrodialysis ("RED") typically a concentrated ionic solution is fed through the dilution compartment and solution of lower ionic concentration is fed through the concentration compartment. In electrodialysis ("ED") typically an ionic solution is fed through all compartments wherein by applying an electric field ions are forced from the solution in the dilution compartments to the solution in the concentration compartments.

In RED, the concentrated ionic solution is typically sea water and the solution of lower ionic concentration is typically fresh or brackish water. Electricity may be generated in an environmentally friendly manner from the solute passing through the membranes from the concentrated solution in the dilution compartment to the concentration compartment, this being accompanied by the generation of output electricity across the electrodes at the ends of the stack. The voltage generated by the concentration difference across each pair of membranes is low, but this voltage is multiplied by increasing the number of alternating cation and anion exchange membranes that separate the two solutions in the membrane stack.

ED uses similar membrane stacks to those used in RED but in this case electricity is applied across electrodes at each end of the stack in order to remove unwanted ions from an ionic solution. ED may be used, for example, to prepare potable water from salty sea water.

The abovementioned RED and ED techniques both require membrane stacks comprising anion and cation exchange membranes arranged in an alternate manner.

There are two general configurations used for IEUs: first, a plate-and-frame-configuration, and second, a spiral-wound configuration.

Figure 1:
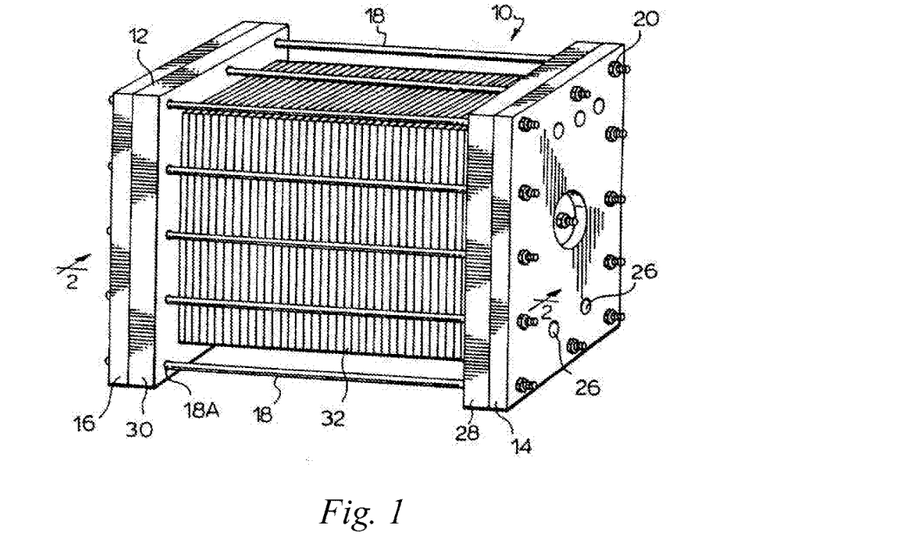
FIG. 1 represents a prior art IEU of plate-and-frame configuration.

IEUs having a plate-and-frame-configuration typically comprise alternate cation-permeable membranes and anion-permeable membranes releasably secured together using end plates bolted together, e.g. as illustrated in FIG. 1. When the membranes become fouled or damaged over time, the end plates may be unbolted and the (individual) membranes cleaned or replaced as necessary.

The disassembly and reassembly of IEUs of the plate-and-frame-configuration is a time-consuming, laborious and difficult operation. Careful alignment of membranes, spacers and gaskets is required to return the stack to its previous, efficient and leak-free performance. To prevent leakages, high torques are required to tighten IEUs of the plate-and-frame-configuration, e.g. torques of between 10 and 30 Nm or even higher are often required to prevent leakages. These high torques put high demands to the components used to make the plate-and-frame unit such as end plates and bolts, and often cause compression of compartments in the stack, increases pressure drop and thereby restricts the flow of liquids through the unit.

WO 2004/051766 proposes adhesively bonded electrochemical stacks as an alternative to the bulky plate-and-frame membrane stack configuration. This avoids the need for gaskets, o-rings or similar devices to seal together the various components of the stack. WO 2004/051766 proposes chemically treating the non-active perimeters of the membranes so that they remain dimensionally stable, with respect to moisture content, after being assembled in a bonded electrochemical cell stack. However such chemical treatments involve highly caustic chemicals and are tricky and inconvenient to perform, increasing both the complexity and cost of making membrane stacks.

We have now devised a process for making membrane stacks which avoids the need for complex chemical treatment of the membrane periphery. The process may be used to prepare IEUs having a low likelihood of leakage in a rapid and convenient manner. In contrast to conventional plate-and-frame units, the stacks of the present invention may be used to prepare IEUs without requiring large compression torques to prevent leakage.

According to the present invention there is provided a process for preparing a membrane stack comprising the steps of:

(i) interposing a curable adhesive between alternate anion exchange membranes and cation exchange membranes; and
(ii) curing the adhesive;

CHARACTERISED IN THAT said adhesive, when cured, has a Shore A hardness of less than 70 and an elongation at break of at least 50%.

In this document (including its claims), the verb "comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one". For brevity, hereinafter we will often refer to a curable adhesive which, when cured, has a Shore A hardness of less than 70 and an elongation at break of at least 50% simply as "curable adhesive". Similarly, references to such curable adhesives when cured will often be abbreviated to "cured adhesive".

In one embodiment the anion exchange membranes and cation exchange membranes are arranged such that the membrane stack comprises alternate dilution compartments and concentration compartments, each compartment being defined by a cation-permeable membrane and an anion-permeable membrane and at least two edges of each compartment are secured together by curing the curable adhesive such that the edges secured together define the direction in which liquid may flow through the compartments.

The present invention will now be described with reference to the accompanying drawings, in which.

FIG. 1 shows a prior art IEU of plate-and-frame-configuration 10. The prior art IEU 10 has a rectangular frame 12. The frame 12 comprises a rigid front plate 14 and a rigid back plate 16 formed of metal. The front plate 14 and the back plate 16 are releasably secured together in a non-permanent manner by a number of tie-bars or bolts 18.

Figure 2:
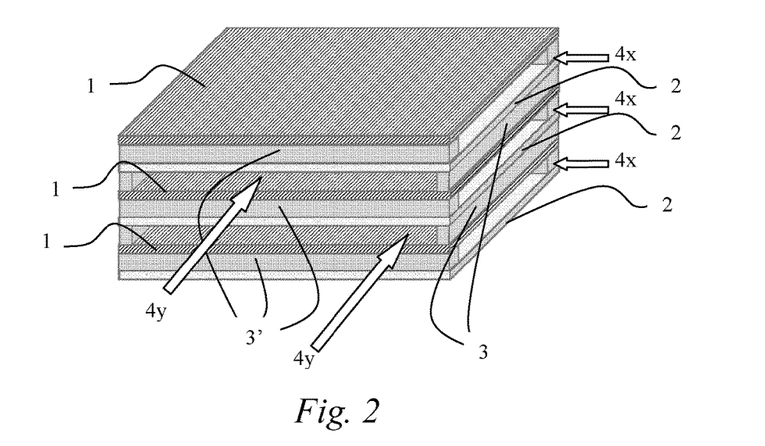
FIG. 2 is a schematic perspective view of a membrane stack according to the present invention.

A non-spiral wound membrane stack (or planar stack) which may be prepared by the process of the present invention shown schematically in FIG. 2. The stack comprises three flat anion exchange membranes 1 and three flat cation exchange membranes 2, with each membrane permanently secured to the next along two opposite edges by means of adhesive lines 3 and 3' (three at the front, three at the back and two on each side) interposed there between. Each pair of membranes 1 and 2 and the adhesive lines 3 and 3' define compartments. The adhesive lines 3 and 3' also define the direction in which liquid may flow through the compartments. The arrows 4x and 4y illustrate the direction in which liquid may flow through each of the five compartments shown in FIG. 2. By alternating the position of adhesive lines 3/3' from one membrane pair to the next, a crossflow arrangement is established in which the liquid passing through the alternate concentration compartments flows in a different direction to liquid passing through the alternate dilution compartments. In the rectangular IEU illustrated in FIG. 2, the direction of flow through each compartment is perpendicular to the direction of flow through the next compartment, creating a crossflow configuration.

Figure 3A:
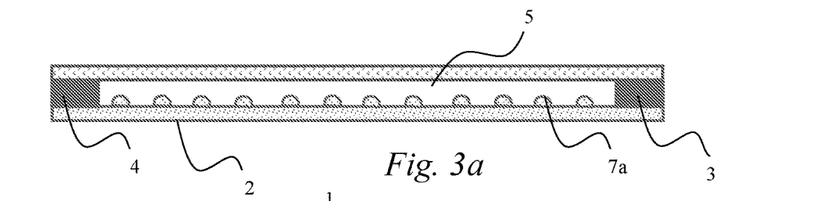
FIGS. 3a to 3e are schematic side views illustrating an embodiment of the present invention using flat, textured membranes.
Figure 3B:
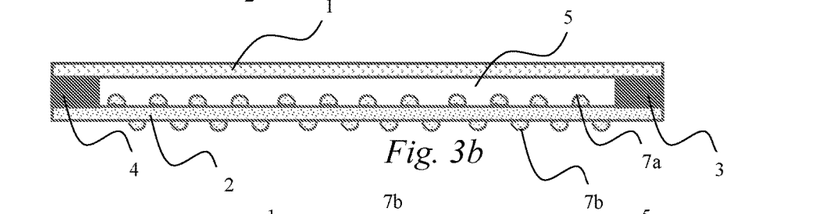
Figure 3C:
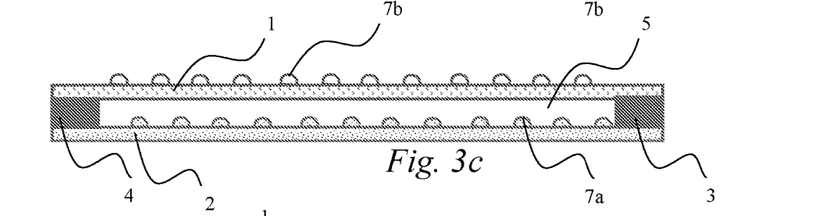
Figure 3D:
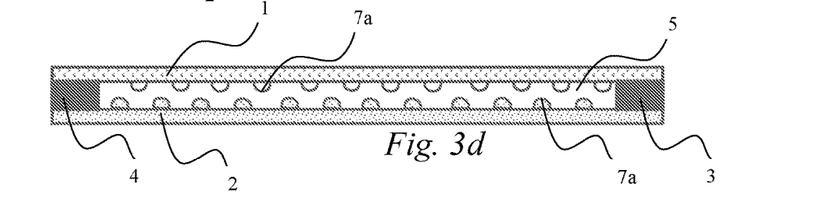
Figure 3E:
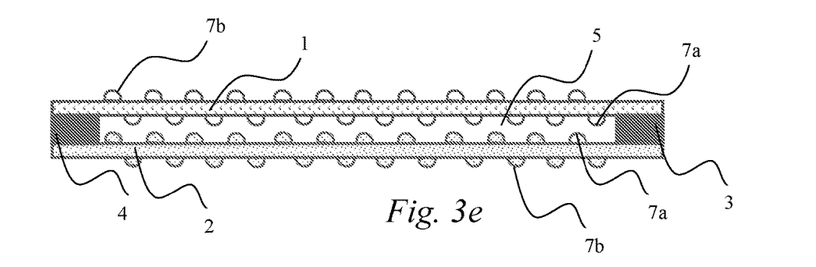

FIGS. 3a to 3e illustrates embodiments of the invention where one or both of the alternate anion exchange membranes and cation exchanges comprise a textured surface profile. In FIGS. 3a to 3e, the compartments 5 are defined by a cation-permeable membrane 2 and anion-permeable membrane 1, permanently secured together along two edges by means of cured adhesive 3 interposed there between. In FIG. 3a the inner surface of the cation exchange membrane 2 has a textured surface profile comprising internal protrusions 7a which can keep the anion exchange membrane 1 and cation exchange membrane 2 apart without the need to include a separate spacer (also called a spacer element) in the compartment. FIG. 3b is similar to FIG. 3a except that both the inner and outer surfaces of the cation exchange membrane 2 have a textured surface profile comprising protrusions 7a and 7b. In the embodiment of FIG. 3b, the inner surface protrusions 7a can keep the anion exchange membrane 1 and cation exchange membrane 2 apart (keeping the illustrated compartment 5 open) and the outer surface protrusions 7b can keep the outer surface of the next compartment (not shown) apart. In FIG. 3c the inner surface of the cation exchange membrane 2 comprises protrusions 7a and the outer surface of anion exchange membrane 1 comprises protrusions 7b. In FIG. 3d the inner surfaces of both the cation exchange membrane 2 and the anion exchange membrane 1 comprise protrusions 7a, thereby increasing the turbulence of liquid as it passes through compartment 5. In FIG. 3e the inner surfaces and outer surfaces of both the cation exchange membrane 2 and the anion exchange membrane 1 comprise protrusions 7a and 7b, thereby increasing the turbulence of liquid as it passes through compartment 5 and increasing the compartment height.

In a preferred embodiment, one or more of the anion exchange membranes and cation exchange comprises a textured surface profile. In this way one may prepare a membrane stack comprising compartments comprising two inner walls and two outer walls wherein at least one of the inner walls (preferably both of the inner walls) and at least one of the outer walls (preferably both of the outer walls) comprise a textured surface profile. This preference is illustrated in FIGS. 3b, 3c and 3e and has the advantage over the embodiments shown in FIGS. 3a and 3d (where the outer walls of the compartment lack a textured surface profile) that one may omit spacers from both the concentration and dilution compartments, thereby simplifying manufacture and reducing the cost of membrane stacks.

In a preferred embodiment the cation-permeable membranes and/or the anion-permeable membranes have a textured surface profile which keeps said membranes apart and/or from touching each other. In this way one may omit the spacer elements which are usually provided in concentration and dilution compartments in order to keep the membranes apart and ensure that liquid may flow freely through the compartments. As a result one may prepare membrane stacks which are free from spacer elements, or have fewer spacer elements, thereby reducing the overall cost of an IEU.

The use of a textured surface profile to create voids through which liquid may pass, instead of using spacer elements, and also has the advantage of reducing fouling, resulting in less down-time and less unit maintenance.

Optionally, however, the process further comprises the step of interposing a spacer element between the alternate anion exchange membranes and cation exchange membranes. In this embodiment the adhesive optionally also secures the spacer element together with the anion exchange membranes and cation exchange membranes.

Optionally the process further comprises the step of treating the anion exchange membranes and/or cation exchange membranes before step (i) in order to enhance adhesion between the membranes and the adhesive. Such treatments include chemical treatments (e.g. etching or contact with an adhesion promoter or primer) and/or physical treatments (e.g. by plasma, corona or flame treatment) and combinations of such methods.

The curable adhesive may be interposed between alternate anion exchange membranes and cation exchange membranes by any suitable technique. Typically the curable adhesive is applied to an anion exchange membrane or cation exchange membrane and then an oppositely charged cation exchange membrane or anion exchange membrane is applied to the curable adhesive.

The adhesive is typically applied to the edge or periphery of the anion exchange membrane or cation exchange membrane using an adhesive applicator, for example a glue gun, which may operated robotically if desired.

One may use the thickness of the curable adhesive interposed between the membranes to influence the inter-membrane distance/height of the compartment if desired.

As curable adhesive one may use a commercially available, non-aqueous adhesive having a Shore A hardness of less than 70 and an elongation at break of at least 50%, when cured. Typically one will interpose a line of curable adhesive between each pair of membranes to be permanently secured together. The line of curable adhesive may be straight and run parallel to the edge of the membranes, although it may optionally take the form of a wavy line of curable adhesive. One may even apply adhesive as multiple dots or bars which coalesce together to provide contiguous adhesive lines when the membranes are pressed together. In a preferred embodiment the cured adhesive is not electrically or ionically conductive.

The cured adhesive preferably provides a water-tight seal between the membranes.

Preferably the curable adhesive is positioned at the very edge of the membranes or at a short distance from the edge (e.g. within the outer 30% of the membrane width, especially within the outer 25% of the membrane width, especially within the outer 20% of the membrane width.

The curable adhesive is preferably such that when cured it provides a soft, cured adhesive. This has the advantage that if the adhesion between the cured adhesive and a membrane breaks, the cured adhesive can still function as a sealant by acting as a conventional gasket between the membranes. The softness is also useful for accommodating dimensional variations of the membrane, e.g. due to swelling or flow pressure fluctuations.

Preferably the texture of the cured adhesive matches the texture of the membranes.

Thus the cured adhesive is preferably soft. The softness of the cured adhesive is suitably expressed in Shore A hardness units and can be measured using a durometer Shore A hardness may be measured in accordance with ISO 868. The cured adhesive preferably has a Shore A hardness of less than 70, more preferably less than 65. Preferably the cured adhesive has a Shore A hardness of at least 10.

Preferably the cured adhesive has a high degree of elasticity. The degree of elasticity can be expressed as the elongation at break, also referred to as engineering tensile strength, and can be measured by a tensile testing machine. Thus an adhesive and curing conditions are preferably selected such that step (ii) results a cured adhesive which has an elongation at break of at least 50%, more preferably at least 100%.

Tensile strength and elongation at break of the adhesives may be measured by the method of ISO 37 (i.e. on a sample of the adhesive when cured in isolation).

The tensile strength of the cured adhesive is often not crucial when the membrane stack is to be incorporated into a housing. Preferably the cured adhesive has a tensile strength>0.4 N/mm$^2$, more preferably >0.5 N/mm$^2$.

The viscosity of the curable adhesive is preferably sufficiently high that the curable adhesive remains in the desired location between the membranes during step (i) and (ii). On the other hand, the viscosity of the curable adhesive is preferably sufficiently low that the curable adhesive can flow into and fill any gaps between the membranes before it is cured in step (ii), particularly when the membranes are textured. Bearing these factors in mind, the curable adhesive preferably has a viscosity of from 10 to 10,000 Pa·s, more preferably 20 to 1,000 Pa·s, when measured at a shear rate of 0.1 s$^{-1}$ at 23° C. The viscosity may be measured by a rheometer e.g. a Physica MCR301 rheology meter from Anton Paar GmbH.

The curable adhesive is preferably thixotropic.

The curable adhesive selected for the process may be influenced to some extent by composition of the membranes to be adhered together and their surface properties. Suitable adhesives include silicone adhesives, two-component polyurethane adhesives and hot-melt adhesives to mention but a few. Hot-melt adhesives can be used for membranes that are resistant to high temperatures. However hot-melt adhesives are not preferred for membranes that are not resistant to high temperatures because they can re-melt, causing the membrane stack to fail.

Epoxy adhesives are generally not preferred because usually they result in hard, cured adhesives having a low elongation at break.

Preferably the adhesive is a silicone adhesive. This is because silicone adhesives are often soft when cured and have a long elongation at break. Examples of suitable silicone adhesives include Ottocoll silicone adhesives from Otto Chemie (e.g. Ottocoll® S610 and S640, two-part alkoxy silicones); Sikasil® silicone sealants (e.g. Sikasil® SG-18, SG-20, SG-500, SG-500 CN, SG-550, GS-621, IG-25, IG-25 HM Plus, WS-305 CN, WS-355, WS-605 S FS-665 and FS-665 SL); Sikaflex® and Sikabond® silicone adhesives from Sika®; Mastersil® silicone adhesives from Masterbond; silicone adhesive sealant from Permatex.

Further adhesives include polyurethane adhesives, e.g. Powerline and Marine adhesives from 3M™ Desmoseal® S adhesives from Bayer; and hybrid adhesives such as Geniosil® adhesives from Wacker Chemie and Hybrid Adhesives from 3M™. An example of an epoxy-containing adhesive having a Shore A hardness of less than 70 and an elongation at break of more than 50% is Duralco™ 4538N, preferably with a hardener/resin ratio of at least about 2:1. Duralco™ 4538N may be obtained from Cotronics Corp.

The curable adhesive optionally contains further components, for example strengthening material or beads. Strengthening materials and beads are useful for creating a constant distance between the membranes and can help to create compartments of uniform height.

The strengthening material may be, for example, a strip of tape which may be non-porous or porous and which carries the adhesive on both sides, e.g. a double-sided adhesive tape. For example, in the present process one may interpose a tape carrying curable adhesive on both sides between alternate anion exchange membranes and cation exchange membranes.

As tape one may use, for example, a woven or non-woven fabric. When the tape is porous it is preferably saturated with the curable adhesive.

Double sided adhesive tapes are available commercially and include, for example VHB tape from 3M™.

The optional beads can be made of any suitable material, for example glass, silica, polymethylmethacrylate (PMMA), crosslinked polymethylmethacrylate ethylene dimethacrylate, polystyrene and crosslinked polystyrene divinylbenzene. The size of the beads may be selected depending on the desired inter-membrane distance. The optimal amount of spacer beads is from 0.5 wt % and 50 wt %, relative to the weight of adhesive.

Preferably one chooses a curable adhesive which results in a strong bond between the membranes, even when the membrane stack is in use. In use the stack may be exposed to a variety of liquids (e.g. fresh water, brackish water, sea water, brine etc.), elevated temperatures, high or low pH etc.

The curable adhesive may be cured by any suitable process, for example by heating, irradiation, high humidity, evaporation, ageing, polymerization and/or contact with a curing agent or hardener. Also a combination of methods may be used. Step (ii) results in a cured adhesive which secures the anion exchange and cation exchange membranes together.

The process selected for curing the curable adhesive will typically be chosen to match the particular adhesive used in the process.

The means selected for curing the adhesive will typically depend on the type of adhesive used.

Preferably step (ii) is performed at a temperature of 10 to 100° C., more preferably 18 to 80° C.

While not wishing to be limited to any particular theory, it is believed that by using an adhesive which, when cured, has a Shore A hardness of less than 70 and an elongation at break of at least 50%, the resultant membrane stack is better able to cope with the stresses and strains caused by the stack membranes swelling in use. The softness of the cured adhesive allows it to expand to some extent when adjacent cationic and anionic membranes swell to different extents. This can be contrasted with the use of hard adhesives where subsequent contact of the membranes with liquids can cause membranes to swell to different degrees and then distort relative to each other, creating large stresses and strains on the inflexible adhesive bond which can break and thereby cause inter-membrane leakage in use.

In one embodiment the membranes are preferably swollen with a liquid which the membranes will come into contact with when the membrane stack is used. Typically the membranes are swollen with water (e.g. water vapour) or swollen with an aqueous liquid, e.g. a salt solution (e.g. brine, sea water or brackish water).

In order to ensure that the membranes are in a swollen state when step (ii) is performed (if a swollen state is desired) the process may use anion exchange membranes and cation exchange membranes which are wet. Alternatively, the process optionally further comprises the step of swelling the anion exchange membranes and cation exchange membranes before and/or during the performance of step (ii). In this way one may ensure that the membranes used in step (ii) are in the swollen state.

One may swell the membranes by any suitable process. For example, one may apply a liquid (e.g. water or an aqueous solution) to the membranes, optionally wiping off excess liquid from the membranes before the curable adhesive is interposed between the membranes (e.g. by applying the curable adhesive to one of the membranes and then applying an oppositely charged membrane to the membrane carrying the curable adhesive). Alternatively, one may swell the membranes by exposing them to a high humidity atmosphere or to salt solutions, e.g. such that the membranes swell to the same or to a similar extent to the swelling which occurs when the membranes are used in stacks.

Preferably, when performing step (ii), the membranes are in a swollen state which is substantially the same as the swollen state the membranes will be in when the stack is used. For example, when step (ii) is performed the extent to which the membrane is swollen is preferably within +/−2%, more preferably within +/−1%, of the extent of swelling when the membrane is in use.

The extent to which a membrane is swollen ("ES") may be determined by performing the calculation shown in Formula (1) below:

$$ES = [(L_{swollen} - L_{dry})/L_{dry}] \times 100\%$$  Formula (1)

wherein:
$L_{dry}$ is the width of the membrane under ambient conditions (e.g. 25° C. and relative humidity 30%); and
$L_{swollen}$ is the width of the membrane after it has been swollen.

The width direction is the direction (X or Y) in which the membrane shows the most swelling.

When the membrane comprises a support (e.g. the membrane is a composite membrane) the ES may be influenced by the properties of the support.

Preferably the average value of ES is within 2% of the maximum extent of swelling of the membrane in use, i.e. when soaked in an aqueous salt solution having a concentration representative for the concentration the membrane will experience during use. For example, if the ES of a membrane when used in a stack is 4%, the ES for the same membrane when it is used in step (i) and/or (ii) of the present process is preferably 2% to 6%.

In one embodiment, step (ii) is performed at a relative humidity of more than 60%, preferably more than 70%, especially more than 80%, more especially more than 90%. The optimal relative humidity depends on the properties of the membrane and on the application in which the membrane will be used. In fact step (ii) may even be performed at a relative humidity of up to 100%. However complete wetting is less preferred because in some cases it is more difficult to achieve good adhesion to wet membrane surfaces. Therefore it is preferred that step (ii) is performed at a relative humidity of less than 100%.

When performing step (ii) at a relative humidity of more than 60% one will typically allow time for the membrane to swell before curing the adhesive.

The conditions which may be used to convert the anion exchange membranes and cation exchange membranes to the swollen state may be the same or different, because the extent to which anion exchange membranes and cation exchange membranes swell when used in membranes stacks is usually very different.

Thus the process optionally comprising the step of swelling the anion exchange membranes and swelling the cation exchange membranes, wherein the methods used to swell the anion exchange membranes are identical to or are not identical to the conditions used to swell the cation exchange membranes. For example, one may swell the cation exchange membranes at a higher relative humidity ("RH") than the RH used to swell the anion exchange membranes, e.g. a RH at least 10% higher. For ease of processing one may choose identical conditions.

One may also swell the anion exchange membranes and the cation exchange membranes using water and a salt solution, e.g. one of the membranes is swollen using water or a salt solution and the other is swollen using a salt solution which has a higher salt concentration (e.g. stronger by at least 0.5 mol/liter, preferably at least 1.0 mol/liter).

The membranes used in step (i) may in a swollen state or not in a swollen state when they first come into contact with the curable adhesive. For example, the membranes used in step (i) may be in a swollen state (e.g. partially or fully swollen) when they first come into contact with the curable adhesive. Alternatively, the membranes used in step (i) may be non-swollen (e.g. dry) when they first come into contact with the curable adhesive and then the membranes are swollen after they have come into contact with the curable adhesive and before or during curing step (ii). Thus the present process optionally comprises the step of swelling the alternate anion exchange membranes and cation exchange membranes between step (i) and step (ii) or during step (ii).

The present process optionally comprises the step (iii) of storing the membrane stack under conditions which prevent the membrane stack from drying out. Thus one may optionally store the membrane stack in a waterproof container which prevents the membrane stack from drying out. In this way one may avoid stresses and strains on the cured adhesive which arise from the membrane drying out from the swollen state to a dry, non-swollen state and thereby reduce the likelihood of the membrane stack bursting due to failure of the cured adhesive. Preferably the anion and cation exchange membranes are substantially non-porous, e.g. they comprise pores having an average diameter of less than 1 nm.

The membranes optionally have a textured surface profile and in fact the presence of a textured surface profile is preferred because the textured surface profile can be used to help keep the membranes apart when they are in the stack, keeping the compartments open and allowing liquid to pass freely through the compartments. Furthermore, the textured surface profile can be used instead of including spacer elements in the stack, thereby simplify production of the stacks and reducing their cost.

The process of the present invention is particularly advantageous for preparing membrane stacks comprising one or more membranes having a textured surface profile. Stacks of the plate-and-frame-configuration typically rely upon compression forces to prevent leakage between membranes. However when one or more of the membranes has a textured surface profile, it can be difficult to obtain a fluid-tight seal because gaps caused by the textured can give rise to leaks between the membranes. However, step (i) of the present process can be used to fill any gaps between the membranes caused by the surface texture, thereby reducing the chances of inter-membrane leakage. While it would be possible to prepare plate-and-frame-configuration membrane stacks using membranes having a textured surface profile at their centre and no profile at their periphery, in order to prevent leakage caused by the peripheral textured surface profile, this is more complicated, more expensive and much less amenable to mass production than producing continuous sheets of membrane having a uniform textured surface profile along its entire length.

The texture of the optionally textured surface profile preferably comprises protrusions. The pattern of the protrusions can be varied widely and may be irregular, although they are preferably regular so as to create a textured membrane having uniform permeation properties across at least 90% of the part of its surface which is or will be in contact with liquid when the stack is being used (thus excluding the part of the surface that is adhered to another membrane). Examples of suitable protrusions and indentations include circular cones, multi-angular pyramids (e.g. triangular pyramidal, square pyramidal and hexagonal pyramidal), hemispheres, mesas (e.g. square, triangular and circular mesas), domes, circular truncated cones, truncated pyramids, diamonds, short ridges, and combinations of two or more thereof.

The average distance between the anion exchange membrane and cation exchange membrane is known as the "compartment height", "inter-membrane distance" or "IMD". Preferably the IMD is at most 1 mm, more preferably at most 0.5 mm. The IMD may be determined by measuring the total (average) thickness of the cell at the (secured) edges and subtracting the thickness of the membranes excluding the protrusions, measured as an individual layer, divided by the number of compartments. Preferably the IMD is determined at the edges that are secured together.

Preferably the textured surface profile comprises protrusions at least 80% (preferably 100%) of which have a maximum dimension in all directions (length, width and height) of less than 20 mm.

Preferably the textured surface profile comprises protrusions which have a maximum dimension in all directions (length, width and height) of 0.04 to 10 mm, more preferably 0.05 to 6 mm.

Preferably the textured surface profile comprises protrusions which are separated from each other by an average distance of at least 0.1 mm, more preferably at least 0.5 mm, e.g. by 1, 2, 4, 8, 12 or 20 mm when measured at the base of the protrusion.

In one embodiment the membrane stack preferably has a rectangular cross-sectional profile along two of the x, y and z axes and the cross-sectional profile of an n-sided polygon along the third axis, wherein n is an even integer having a value of at least 4, e.g. 4, 6, 8, 10 or 12. For example, the membrane stack may have a rectangular cross-sectional profile along the x and y axes and a hexagonal cross-sectional profile along the z-axis. Preferably the membrane stack has rectangular cross-sectional profiles along all three of the x, y and z axes, e.g. each of said cross-sectional profiles independently is square or oblong.

Typically the anion exchange membranes and the cation exchange membranes have substantially the same size and shape. Thus the anion exchange membranes and the cation exchange membranes may be superimposed, one on the other, to give a box-shaped stack.

When the membranes are rectangular, the length ratio of the longest side to the shortest side of the rectangular membranes is preferably <6:1, more preferably <4:1, e.g. <2:1 or about 1:1.

Preferably the stack comprises more than one concentration compartment and more than one dilution compartment, more preferably at least 20, especially 30 to 1000 concentration compartments and at least 20, especially 30 to 1000 dilution compartments.

The membrane stack is preferably a crossflow membrane stack.

The membrane stacks of the present invention are preferably planar, i.e. not spiral wound.

According to a second feature of the present invention there is provided a membrane stack obtained by the process according to the first aspect of the present invention.

According to a third feature of the present invention there is provided an ion exchange unit (IEU) comprising an anode, a cathode and a membrane stack according to the second aspect of the present invention.

The IEU optionally comprises more than one membrane stack according to the present invention, preferably each stack comprising an anode and a cathode.

The IEU of the third feature of the present invention preferably has a plate-and-frame-configuration.

Anion exchange membranes and cation exchange membranes having a textured surface profile on one or both surfaces can be prepared from membranes lacking a textured surface profile by any one of a number of methods. For example, the textured surface profile may be applied to a membrane lacking a textured surface profile by so-called (embossing) roll-to-roll principle in a single manufacturing line in an efficient and cost effective manner.

In an alternative method, a membrane having a textured surface profile on one or both surfaces may be produced by performing an extrusion process, optionally also performing the abovementioned embossing process. In a further method one may obtain membranes having a textured surface profile by, for example, casting membranes on textured surfaces.

Alternatively, one may apply a textured surface profile to a membrane lacking such a surface profile by a process comprising rotary screen printing, flatbed screen printing, gravure printing, slot-die coating, dispenser printing, etc. It will be understood that the coating method used depends amongst other things on the coating material used.

The membrane stacks according to the second aspect of the present invention may be provided as modular units which can be included in an IEU in any number. Thus one aspect of the present invention provides an IEU comprising a plurality of modular units, each modular unit comprising a stack according to the second aspect of the present invention. The IEU may be relatively easily assembled, disassembled, expanded and maintained by replacing or adding the modular units as necessary.

Optionally each of the modular units has a cathode and an anode. In the case of an ED unit, the modular units preferably further comprise a means for applying an electrical voltage between the anode and the cathode.

The IEU comprising a plurality of modular units optionally further comprises a means for passing the liquid which has passed through a module into a further module of the unit, for example one or more pipes.

The modular units may be connected in series or in parallel with each other.

Preferably the IEU comprises a quick-release securement means to allow facile attachment of the modular units to the IEU and facile release of the modular units from the IEU.

In a preferred embodiment, the stacks comprise a rigid, compact housing.

According to a fourth aspect of the present invention there is provided a stack or a module according to the present invention and packaging for protection of the stack or a module during transportation, wherein the stack or a module is located inside the packaging. Preferably the packaging is waterproof. This prevents the membrane stack from drying out and the membranes reverting to the non-swollen state during storage and/or transportation.

The packaging may be any packaging suitable for the transportation of the stack or a module via a postal, courier or other delivery service. Typically the packaging is air tight, for example the packaging may comprise a sealed plastic bag or canister which contains the stack or a module.

Although the stacks of the present invention are primarily intended for use in RED or ED, they may also be used for other purposes requiring stacks comprising cationic and anionic membranes, e.g. continuous electrodeionisation (CEDI), capacitive deionisation used in e.g. flow through capacitors (FTC), Donnan or diffusion dialysis (DD) for e.g. fluoride removal or the recovery of acids, pervaporation for dehydration of organic solvents, electrolysis (EL) of water or for chlor-alkali production. All of the foregoing are IEUs.

According to a fifth aspect of the present invention there is provided an ED unit, an RED unit, an electrodeionization module or a diffusion dialysis apparatus, comprising one or more membrane stacks according to the second aspect of the present invention. The electrodeionization module is preferably a continuous electrodeionization module.

When the IEU is intended for use in reverse electrodialysis, the IEU preferably comprises an inlet for providing a flow of salty water through the dilution compartment and an inlet for providing a flow of water having a lower solute content through the concentration compartment.

The preferences for the third, fourth and fifth aspect of the invention (e.g. the preferred membranes, seals, surface profile etc.) are as hereinbefore described in relation to the earlier aspects of the present invention.

EXAMPLES 1 TO 7 AND COMPARATIVE EXAMPLES

Abbreviations

AMPS is 2-Acryloylamido-2-methylpropanesulfonic acid from Hang-Zhou (China).

DMAPAA-Q is a 75 wt % solution of N,N-Dimethylamino methyl chloride quarternary in water from Kohjin (Japan).

MBA is N,N'-methylene bisacrylamide from Sigma Aldrich.

MeHQ is hydroquinone monomethyl ether, a polymerisation inhibitor from Merck.

IPA is 2-propanol from Shell (an inert solvent).

Darocur™ 1173 is a photoinitiator from BASF.

$LiNO_3$ is lithium nitrate.

$LiOH.H_2O$ is lithium hydroxide monohydrate.

Sikasil™ SG500, WS-606 S and AS-787 SL, Sikaflex™ 228 and 290i DC and Sikabond™ TF plus N are adhesives from SIKA AG, Switzerland Ottocoll™ S610 is an adhesive from Otto Chemie, Germany.

Araldite™ 2022 is a two component toughened methacrylate adhesive system from Huntsman The tensile strength and elongation at break of the adhesives used for Examples 1 to 7 were provided by the supplier and were measured by the method of ISO 37.

The Shore A hardness of the adhesives used for Examples 1 to 7 was the value provided by the supplier, measured in accordance with ISO 868.

The tensile strength and elongation at break for the adhesive used for Example C1 was provided by the supplier and was measured according ISO 178.

The hardness of the adhesive used for Example C1 as provided by the supplier is D75 (Shore D hardness measured according ISO 868), which corresponds to a value>100 at the Shore A scale.

The Adhesion quality was checked by manual inspection and scored as follows:
- − means insufficient adhesion, membranes did not adhere to each other.
- + means sufficient adhesion, however membranes could be separated by applying force.
- ++ means excellent adhesion, membranes could not be separated without damaging them.

Stage A: Preparation of Cation Exchange Membranes (CEMs) and Anion Exchange Membranes (AEMs)

The compositions described in Table 1 were each applied (separately) to an aluminium underground carrier by hand, using a 120 μm wire wound bar, at a speed of approximately 5 m/min. Non-woven supports (Novatexx™ 2223-10 from Freudenberg Filtration Technologies) were applied to the compositions. The non-woven supports were completely soaked with the compositions. Subsequently the compositions were leveled using a 4 micrometer wire wound rod coater. The temperature of the compositions was about 50° C.

The CEM and AEM were prepared by curing the compositions soaked into the non-wovens using a Light Hammer LH6 from Fusion UV Systems fitted with a D-bulb working at 100% intensity with a speed of 30 m/min (single pass). The exposure time was 0.47 seconds. The resultant AEM and CEM membranes were stored dry.

TABLE 1

| Component | Composition used to Make a CEM (wt %) | Composition used to Make an AEM (wt %) |
| --- | --- | --- |
| AMPS | 49.05 | 0 |
| DMAPAA-Q | 0 | 53.15 |
| MBA | 11.6 | 9.9 |
| Water | 20 | 7.0 |
| IPA | 8.0 | 8.4 |
| Darocur ™ 1173 | 0.5 | 0.5 |
| LiOH•$H_2O$ | 9.8 | 0 |
| $LiNO_3$ | 0 | 20.0 |
| MEHQ | 0.05 | 0.05 |
| Surfactant | 1.0 | 1.0 |

Effect of Salt Concentration on Swelling

Table 2 shows the swelling behavior of the above AEM and CEM in water and in NaCl solutions. The extent of swelling ("ES") was calculated using Formula (1) described above.

TABLE 2

Effect of Salt Concentration on Swelling

| Conditions | CEM ES | AEM ES |
|---|---|---|
| Soaked in pure water for 12 hours at 25° C. | 6.5% | 3.4% |
| Soaked in 0.5M NaCl for 12 hours at 25° C. | 5.8% | 3.3% |
| Soaked in 4.0M NaCl for 12 hours at 25° C. | 4.6% | 2.0% |

Table 2 shows that the ES is influenced by the salt concentration of liquids which come into contact with the membranes during usage. The ES decreased as the salt concentration increased. The ES also differed significantly between the two membranes types.

Effect of Humidity on Swelling

Table 3 shows the swelling behavior of the AEM and CEM described in Stage A above at various humidity values. The ES was calculated using Formula (1) described above.

TABLE 3

Effect of Humidity on Swelling

| Condition | CEM ES | AEM ES |
|---|---|---|
| 60% RH for 12 hours at 25° C. | 1.4% | 2.8% |
| 80% RH for 12 hours at 25° C. | 2.8% | 3.5% |
| 95% RH for 12 hours at 25° C. | 4.8% | — |
| 99% RH for 12 hours at 25° C. | 6.6% | — |

As shown in Table 3 above, the extent of swelling increased as the relative humidity increased. The extent of swelling differed significantly between the two membranes types.

Stage B: Preparation of a Membrane Stack

A mild corona treatment was applied to the surfaces of the CEM and AEM membranes described in Stage A. The resultant membranes were swollen by exposing them for 12 hours to an atmosphere having a 98% relative humidity at 25° C. The extent of swelling ("ES") was 3.5% for the AEM and 6.5% for the CEM membranes. In a second series of experiments the AEM and CEM membranes were equilibrated in pure water for 2 hours at 25° C. The ES was 3.4% for the AEM and 6.5% for the CEM membranes. The resultant, swollen membranes were cut to a size of 16×16 cm. Crossflow membrane stacks were then prepared as follows:

Step (i)

Curable adhesive was interposed between alternate 16×16 cm squares of cation exchange membranes and anion exchange membranes swollen at 98% RH at 25° C. as described above as follows. Adhesive (width about 10 mm) was applied to opposite edges of a square of the anion exchange membrane. A PES spacer (0.300 mm thickness) was placed on top of the membrane and then a square of cation exchange membrane was applied to the square of the anion exchange membranes carrying the adhesive and spacer. Further curable adhesive (width about 10 mm) was applied to opposite edges of the square of cation exchange membrane, along edges perpendicular to the edges glued in the preceding layer. A further PES spacer (0.300 mm thickness) and an anion exchange membrane were applied to the square of cation exchange membrane carrying the curable adhesive and spacer. This procedure was repeated to build a laminate comprising 5 membranes and four spacers.

Step (ii)—Curing the Adhesive

A weight of 1 Kg was placed on the laminate obtained in step (i) and the curable adhesive was cured by ageing for 24 hours at 25° C. and a relative humidity of 90%. The humidity served to cure the adhesive. After curing, the edges were cut off to obtain a stack of the desired size.

Test Results

The test results on membrane stacks prepared as described in Stage B above for various curable adhesives is shown in Table 4 below:

TABLE 4

| Example | Curable Adhesive | Shore A hardness | Elongation at break (%) | tensile strength (N/mm²) | Adhesion quality | Stack leakage |
|---|---|---|---|---|---|---|
| 1 | Sikasil ™ SG500 | 45 | 300 | 2.2 | ++ | + |
| 2 | Sikaflex ™ 228 | 35 | 400 | 1.0 | + | + |
| 3 | Sikasil ™ WS-605 S | 20 | 800 | 1.0 | + | + |
| 4 | Ottocoll ™ S610 | 45 | 325 | 2.5 | ++ | + |
| 5 | Sikaflex ™ 290i DC | 40 | 700 | 3.5 | ++ | + |
| 6 | Sikasil ™ AS-787 SL | 30 | 130 | 1.0 | + | + |
| 7 | Sikabond ™ TF plus N | 25 | 600 | 1.5 | ++ | + |
| C1 | Araldite ™ 2022 | >100* | 2-7** | 43 | + | − |

*Shore D value of 75
**measured according ISO 178.

Stage C: Preparation of IEUs (RED Units)

Eight RED units were prepared, each comprising stacks exclusively from of one of Examples 1 to 7 and C1 above. Each RED unit was of the plate-and-frame configuration and comprised (a) end plates; (b) an electrolyte chamber including an anode on the bottom end plate; (c) the relevant membrane stack on the electrolyte chamber; (d) side plates with manifolds; (e) a second electrolyte chamber including a cathode on the top end plate; (f) an inlet; and (g) and outlet. The end plates were bolted together with the electrolyte chambers and stacks between them using a torque of 1 Nm.

The RED units obtained from the stacks described in Examples 1 to 7 performed well giving power density outputs between 0.63 and 0.72 W/m², and did not leak even after being used 3 times for 5 hours each time. In contrast, the RED unit obtained from the stacks described in Example C1 began to leak in the first test after about 1 hour.

The invention claimed is:

1. A process for preparing a membrane stack comprising the steps of:
   (i) interposing a curable adhesive between alternate anion exchange membranes and cation exchange membranes; and
   (ii) curing the adhesive;
       wherein said adhesive, when cured, has a Shore A hardness of less than 70 and at least 10 and an elongation at break of at least 50%.

2. The process according to claim 1 wherein said adhesive, when cured, has a Shore A hardness of less than 65 and/or an elongation at break of at least 100%.

3. The process according to claim 1 wherein said membranes are in a swollen state when step (ii) is performed.

4. The process according to claim 1 wherein the curable adhesive is interposed between the alternate anion exchange membranes and cation exchange membranes by a process comprising applying the curable adhesive to an anion exchange membrane or cation exchange membrane and then applying an oppositely charged cation exchange membrane or anion exchange membrane to the curable adhesive.

5. The process according to claim 1 wherein anion exchange membranes and cation exchange membranes are arranged such that the stack comprises alternate dilution compartments and concentration compartments, each compartment being defined by a cation-permeable membrane and an anion-permeable membrane and at least two edges of each compartment are permanently secured together by curing the curable adhesive such that the edges secured together define the direction in which liquid may flow through the compartments.

6. The process according to claim 1 wherein the cation exchange membranes and/or the anion exchange membranes have a textured surface profile.

7. The process according to claim 1 which further comprises the step of treating the anion exchange membranes and/or cation exchange membranes before step (i) in order to enhance adhesion between the membranes and the adhesive.

8. The process according to claim 1 wherein the stack is a crossflow membrane stack.

9. The process according to claim 1 wherein the curable adhesive has a viscosity of from 10 to 10000 Pa·s, when measured at a shear rate of $0.1\ s^{-1}$ at 23° C.

10. The process according to claim 1 wherein the membrane stack comprises alternating dilution compartments and concentration compartments, each compartment comprising a cation-permeable membrane wall and an anion-permeable membrane wall, and a cured adhesive as water-tight seal between the membranes.

11. The process according to claim 1 wherein the cation exchange membranes and/or the anion exchange membranes have a textured surface profile and the textured surface profile comprises protrusions at least 80% of which have a maximum dimension in all directions of less than 20 mm.

12. The process according to claim 1 wherein the liquid passing through the alternate concentration compartments flows in a different direction to liquid passing through the alternate dilution compartments.

13. The process according to claim 1 wherein the stack is a crossflow membrane stack and the direction of flow through each compartment is perpendicular to the direction of flow through the next compartment.

14. The process according to claim 1 wherein:
   (i) the membrane stack comprises alternating dilution compartments and concentration compartments, each compartment comprising a cation-permeable membrane wall and an anion-permeable membrane wall, and a cured adhesive as water-tight seal between the membranes;
   (ii) the stack is a crossflow membrane stack and the direction of flow through each compartment is perpendicular to the direction of flow through the next compartment; and
   (iii) the cation-permeable membranes and/or the anion-permeable membranes have a textured surface profile and the textured surface profile comprises protrusions at least 80% of which have a maximum dimension in all directions of less than 20 mm.

15. A membrane stack obtained by the process according to claim 1.

16. An electrodialysis unit, a reverse electrodialysis unit, an electrodeionization module, or a diffusion dialysis apparatus, comprising one or more membrane stacks according to claim 15.

* * * * *